United States Patent
Keller et al.

(10) Patent No.: US 8,037,585 B2
(45) Date of Patent: Oct. 18, 2011

(54) PULLING-OFF DEVICE

(75) Inventors: Karl Keller, Hilchenbach (DE); Konrad Roeingh, Hilchenbach (DE); Kurt Scheffe, Hilchenbach (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 1052 days.

(21) Appl. No.: 11/885,314

(22) PCT Filed: Mar. 5, 2007

(86) PCT No.: PCT/EP2007/001868
§ 371 (c)(1),
(2), (4) Date: Aug. 29, 2007

(87) PCT Pub. No.: WO2007/121806
PCT Pub. Date: Nov. 1, 2007

(65) Prior Publication Data
US 2010/0125992 A1     May 27, 2010

(30) Foreign Application Priority Data
Apr. 24, 2006   (DE) .......................... 10 2006 019 448

(51) Int. Cl.
*B23P 19/04*    (2006.01)
(52) U.S. Cl. ............... 29/252; 29/270; 29/278; 384/556
(58) Field of Classification Search ............ 29/244–265, 29/270–278, 898.08, 426.1, 426.5; 384/556, 384/459, 586, 587; 74/813 R–813 C
See application file for complete search history.

(56) References Cited

U.S. PATENT DOCUMENTS

| | | | | |
|---|---|---|---|---|
| 2,817,142 A * | 12/1957 | Boden et al. | .................... | 29/234 |
| 3,080,199 A * | 3/1963 | Rickley | .......................... | 384/584 |
| 3,180,016 A * | 4/1965 | Toth | .................................. | 29/252 |
| 3,799,636 A * | 3/1974 | Kersting et al. | ............... | 384/556 |
| 4,286,830 A * | 9/1981 | Salter, Jr. | ........................ | 384/584 |
| 4,352,229 A | 10/1982 | Moore | | |
| 6,415,489 B1 * | 7/2002 | Martins et al. | ................... | 29/252 |
| 7,082,800 B1 * | 8/2006 | Muller et al. | ..................... | 72/237 |
| 7,386,939 B2 * | 6/2008 | Di Giacomo | .............. | 29/898.07 |
| 7,836,581 B2 * | 11/2010 | Keller et al. | ..................... | 29/724 |
| 2004/0244201 A1* | 12/2004 | Di Giacomo | .............. | 29/898.07 |

FOREIGN PATENT DOCUMENTS

| | | |
|---|---|---|
| DE | 20 35 698 | 1/1972 |
| DE | 199 45 070 | 3/2001 |
| DE | 103 35 527 | 2/2005 |
| EP | 1 213 061 | 6/2002 |
| EP | 1 609 542 | 12/2005 |

* cited by examiner

*Primary Examiner* — George Nguyen
(74) *Attorney, Agent, or Firm* — Lucas & Mercanti, LLP; Klaus P. Stoffel

(57) ABSTRACT

A device for dismounting the neck bush (4), the bearing bush (5), and the chock (6) from the conically constructed region of the roll neck (2) of a roll (1), where a pressure shoulder ring (8), which is supported on the end face of the neck bush (4), is installed on a roll neck shoulder (3) of the roll (1), is to be improved in such a way that it can be built very short and that it can carry out the dismounting movement with very small pressures of a pressure medium. To this end, it is proposed that a gap (11) be provided between the pressure shoulder ring (8) and the end face (7) of the roll neck (2), that the pressure shoulder ring (8) be coupled with the neck bush (4), and that at least one pressure medium for removing the neck bush (4) and the chock (6) be provided in the gap (11).

11 Claims, 2 Drawing Sheets

PULLING-OFF DEVICE

BACKGROUND OF THE INVENTION

The invention concerns a device for dismounting the neck bush, the bearing bush, and the chock from the conically constructed region of the roll neck of a roll, where a pressure shoulder ring, which is supported on the end face of the neck bush, is installed on a roll neck shoulder of the roll.

DE 103 35 527 A1 discloses devices for dismounting a bearing unit that consists of a chock with a roll neck bearing installed in it from the roll neck of the backup roll of a rolling stand, where a dismounting device is coupled with the bearing assembly. When pressure is applied between the roll neck and bearing assembly, the bearing assembly is dismounted axially with respect to the roll. In the course of the dismounting operation, the bearing assembly is supported on the shoulder of the bearing bush, which is taken along by the bearing assembly. After some additional distance has been traveled, the bearing bush engages the shoulder of the neck bush and removes it from the roll neck.

In this dismounting operation, several idle strokes add up, so that the dismounting unit must travel a large distance to be able to remove the neck bush from the roll neck. This means that the dismounting unit must be constructed very long and therefore that a sufficiently large amount of space must be allowed for this dismounting unit, so that ultimately larger amounts of room are needed for dismounting the neck bush together with the bearing chock. In addition, due to comparatively small piston areas of the dismounting unit, large pressures must be applied to operate the dismounting unit.

SUMMARY OF THE INVENTION

The objective of the invention is to specify a dismounting device which has a short design and in which the dismounting movement is realized with small pressures.

To achieve this objective, it is proposed that a gap be provided between the pressure shoulder ring and the end face of the roll neck, that the pressure shoulder ring be coupled with the neck bush, and that a pressure medium for removing the neck bush and the chock be provided in the gap.

As a result of the fact that the pressure shoulder ring is directly connected with the neck bush, no distances and idle strokes have to be overcome before the extracting force acts on the neck bush. In addition, the large surface area of the end face of the roll neck faces the likewise large-area pressure shoulder ring. As a result of the large surface area, even small pressures of the pressure media are sufficient to remove the neck bush from the roll neck.

It is advantageous if the pressure medium is a fluid and/or gaseous pressure medium.

It has been found to be effective to seal the pressure shoulder ring from the roll neck shoulder by at least one sealing device. This ensures that not too much pressure medium is lost, so that the required pressure can be reliably developed.

If at least one sealing element is also provided between the pressure shoulder ring and the end face of the bearing bush the pressure space becomes even more tightly sealed. This means that the pump for applying the pressure can have a lower pumping capacity.

It is advantageous if at least one bore is provided in the roll neck shoulder, through which pressure medium can be supplied to the gap between the end face of the roll neck and the pressure shoulder ring. This provides a simple means of reaching the gap between the end face of the roll neck and the pressure shoulder ring from the outside.

It is highly recommended that the bore have a connection, preferably a quick-release coupling, at the free end of the roll neck shoulder for connecting a pressure line. This provides a simple means of connecting the pressure medium tank to the pressure space between the end face of the roll and the pressure shoulder ring.

A special advantage is obtained if the bearing oil used for lubricating the radial bearing is used as the pressure medium. This ensures that any mixing of the oil used as the pressure medium and the oil from the oil-fed bearing does not cause any problems.

Alternatively or additionally, the pressure medium can be mechanical pressure means.

In this regard, it is advantageous if the mechanical pressure means consist of at least one spring, which is pretensioned during the mounting of the neck bush. Just as the pressure shoulder ring is released for the dismounting operation in the axial direction, the pretensioned spring can move the pressure shoulder ring in the axial direction. As a result of the fact that the pressure shoulder ring acts directly on the neck bush, the neck bush is removed from the roll neck without the springs having to travel large relaxation distances.

It is advantageous for the spring to be an annular spring or a helical spring. However, to prevent undesired displacements of the springs, they can be mounted in grooves or recesses in the end face of the roll neck and/or in the end face of the pressure shoulder ring that faces the end face of the roll neck.

The invention is explained in greater detail below with reference to the drawings.

DETAILED DESCRIPTION OF THE INVENTION

Figure 1:
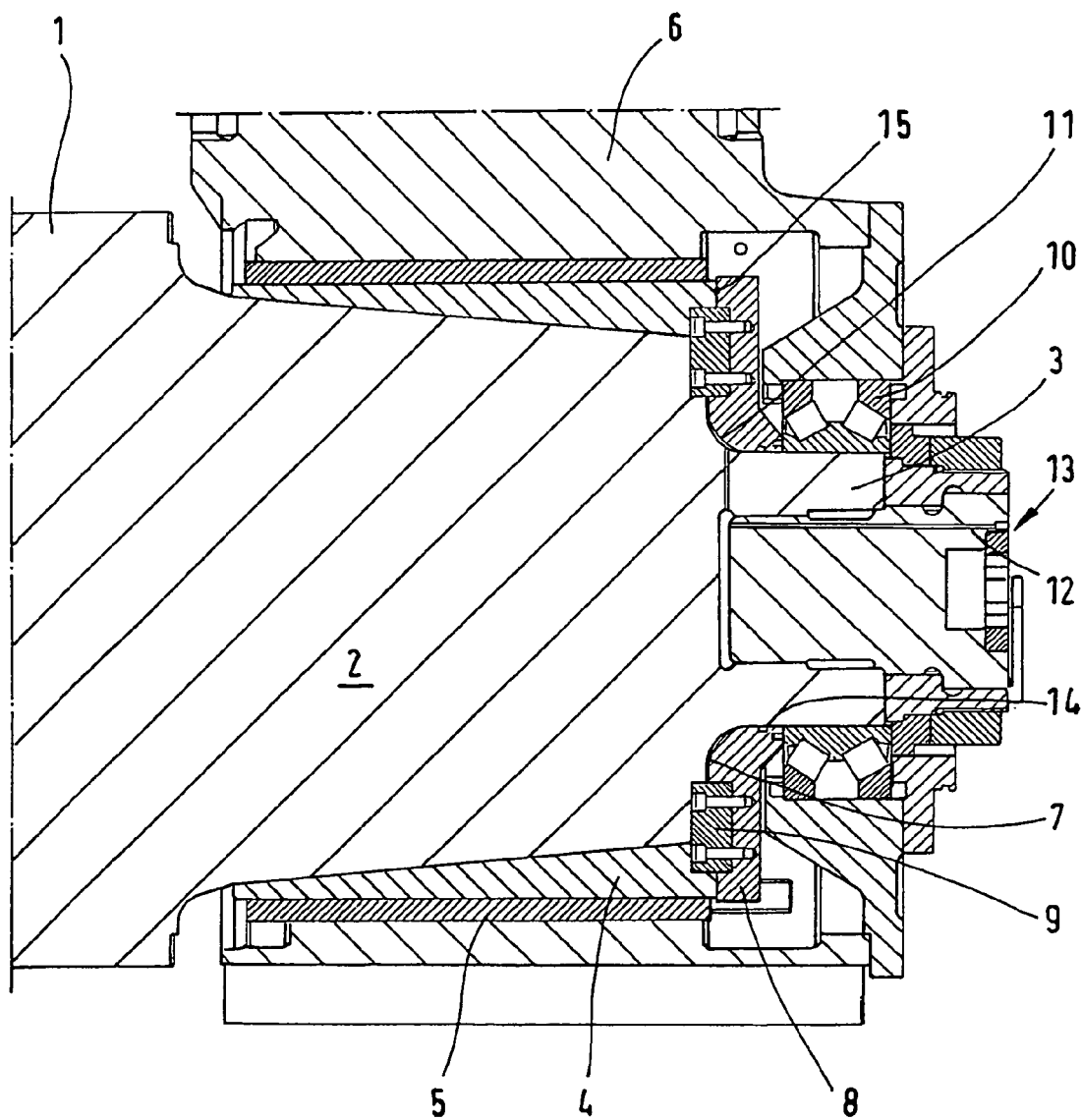
FIG. 1 shows a dismounting device that operates with fluid pressure medium.

FIG. 1 shows a roll 1 with a roll neck 2. A roll neck shoulder 3 is mounted on the roll neck 2. The neck bush 4 is mounted on the roll neck 2 and is surrounded by the bearing bush 5. The bearing bush 5 is held by the chock 6. A pressure shoulder ring 8 is mounted opposite the end face 7 of the roll neck 2. It is supported in such a way that it can be axially displaced on the roll neck shoulder 4 and is sealed by a sealing device 14. The pressure shoulder ring 8 is coupled with the neck bush 4. A sealing element 15 is also provided between the pressure shoulder ring 8 and the neck bush 4. The pressure shoulder ring 8 has a feather key 9, which prevents relative rotational movement between the roll neck 2 and the pressure shoulder ring 8. In addition, the drawing shows a thrust bearing 10, which is supported on the roll neck shoulder 3 and is joined with the chock 6.

A gap 11 is provided between the end face of the roll neck 2 and the end of the pressure shoulder ring 8 that faces the end face of the roll neck. A bore 12 in the roll neck shoulder 3 produces a connection to the gap 11 from the outside. At the free end of the roll neck shoulder 3, the bore 12 has a coupling 13 for connecting the bore 12 to a pressure medium line (not shown).

If pressure medium is introduced into the gap 11 through the bore 12, then the pressure shoulder ring 8 moves to the right in the drawing, and the neck bush 4, which is coupled with the pressure shoulder ring 8, is removed from the roll neck 2.

In addition, the pressure shoulder ring 8 moves the chock 6 with its bearing bush 5 over the thrust bearing 10 to the right in the drawing. This makes it possible to eliminate idle strokes, so that only a very short stroke is sufficient to detach the neck bush 4 and the chock 6 together with the bearing bush 5 from the roll neck 2. In this way, the entire dismounting device can be built very short.

As a result of the large surface area acted on by the pressure medium, small pressures are enough to detach the neck bush 4 from the roll neck 2. Furthermore, due to the direct action of the pressure shoulder ring on the neck bush 4 and the more or less direct action on the chock 6, driving shoulders, which are expensive to manufacture, are no longer necessary on either the neck bush 4 or the bearing bush 5.

Figure 2:
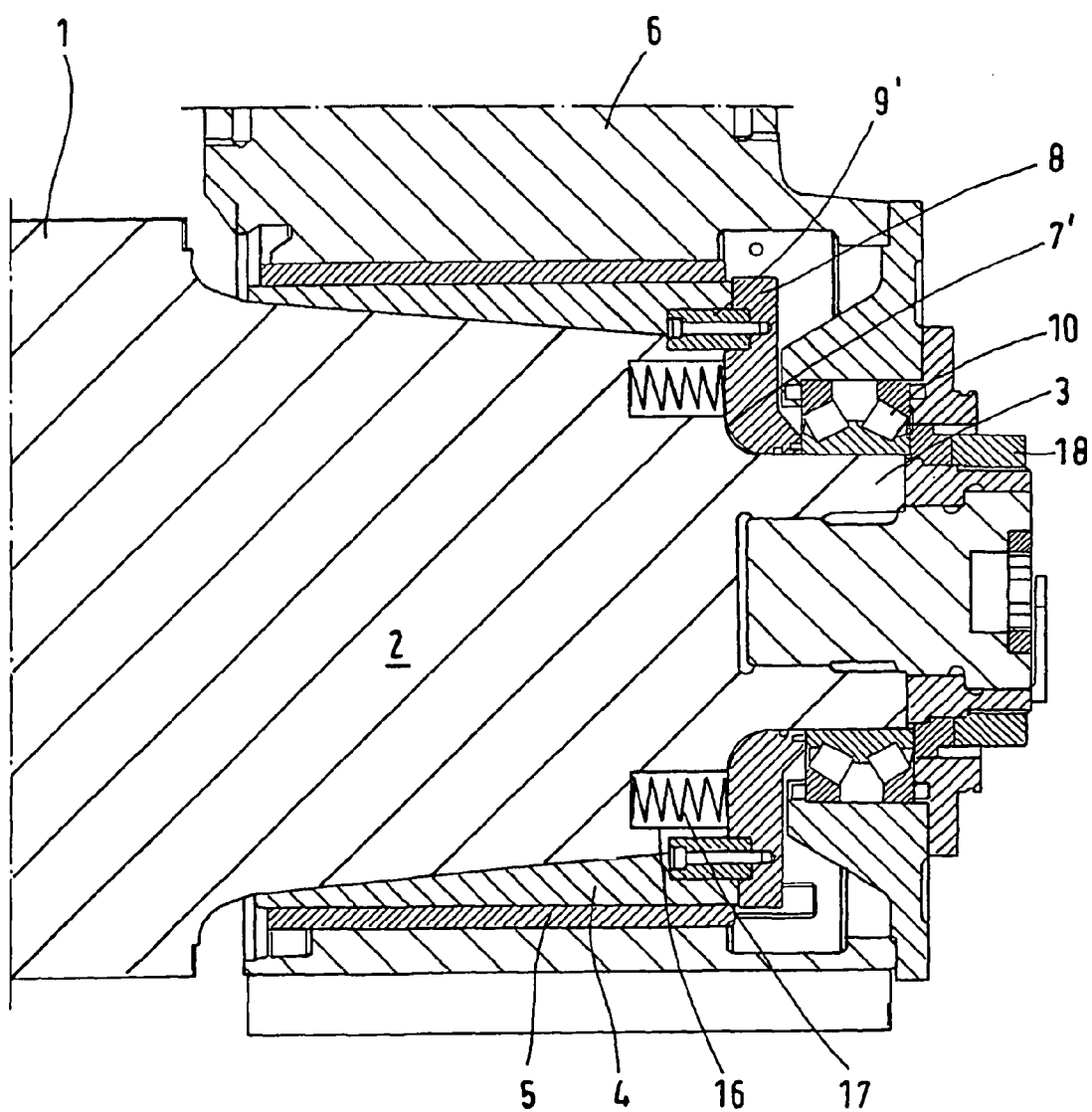
FIG. 2 shows a dismounting device that operates with spring force.

FIG. 2 also shows a roll 1 with a roll neck 2. A roll neck shoulder 3 is mounted on the roll neck 2. The neck bush 4 is mounted on the roll neck 2 and is surrounded by the bearing bush 5. The bearing bush 5 is held by the chock 6. Recesses 16 are formed in the end face 7' of the roll neck 2. Pretensioned springs 17 are mounted in these recesses 16 and are supported against the pressure shoulder ring 8. If the nut 18 is detached from the roll neck shoulder 3, the springs 17 can move the pressure shoulder ring 8 axially to the right in FIG. 2, thereby removing the neck bush 4 from the roll neck 2.

In addition, the pressure shoulder ring 8 moves the chock 6 with its bearing bush 5 over the thrust bearing 10 to the right in the drawing. This makes it possible to eliminate idle strokes, so that only a very short stroke is sufficient to detach the neck bush 4 and the chock 6 together with the bearing bush 5 from the roll neck 2. In this way, the entire dismounting device can be built very short.

LIST OF REFERENCE NUMBERS

1 roll
2 roll neck
3 roll neck shoulder
4 neck bush
5 bearing bush
6 chock
7 end face
8 pressure shoulder ring
9 feather key
10 thrust bearing
11 gap
12 bore
13 coupling
14 sealing device
15 sealing element
16 recesses
17 springs
18 nut

The invention claimed is:

1. A device for dismounting a neck bush (4), a bearing bush (5,) and a chock (6) from a conically constructed region of a roll neck (2) of a roll (1), the device comprising a pressure shoulder ring (8), which is supported on an end face of the neck bush (4), installed on a roll neck shoulder (3) of the roll (1) so as to form a gap (11) between the pressure shoulder ring (8) and an end face (7) of the roll neck (2), where the pressure shoulder ring (8) is coupled with the neck bush (4), and where at least one pressure medium for removing the neck bush (4) and the chock (6) is provided in the gap (11), at least one bore (12) being provided in the roll neck shoulder (3), through which the pressure medium can be supplied to the gap (11) between the end face (7) of the roll neck (2) and the pressure shoulder ring (8), wherein the bore (12) has a connection at the free end of the roll neck shoulder (3) for connecting a pressure medium line.

2. A device in accordance with claim 1, wherein the pressure medium is a fluid and/or gaseous pressure medium.

3. A device in accordance with claim 2, wherein the pressure shoulder ring (8) is sealed from the roll neck shoulder (3) by at least one sealing device (14).

4. A device in accordance with claim 2, wherein at least one sealing element (15) is provided between the pressure shoulder ring (8) and the end face of the neck bush (4).

5. A device in accordance with claim 1, wherein the connection is a quick-release coupling (13).

6. A device in accordance with claim 2, wherein the bearing oil used for lubricating the radial bearing is used as the pressure medium.

7. A device for dismounting a neck bush (4), a bearing bush (5,) and a chock (6) from a conically constructed region of a roll neck (2) of a roll (1), comprising: a pressure shoulder ring (8), which is supported on an end face of the neck bush (4), installed on a roll neck shoulder (3) of the roll (1), where the pressure shoulder ring (8) is coupled with the neck bush (4); and mechanical pressure means provided so as to act between the pressure shoulder ring (8) and an end face (7) of the roll neck (2) for removing the neck bush (4) and the chock (6).

8. A device in accordance with claim 7, wherein the mechanical pressure means consist of at least one spring (17), which is pretensioned during the mounting of the neck bush (4), the bearing bush (5), and the chock (6).

9. A device in accordance with claim 8, wherein the spring is an annular spring.

10. A device in accordance with claim 9, wherein the annular spring is secured against displacement as a spring assembly partly in an annular groove in the end face (7) of the roll neck (2) and/or in the pressure shoulder ring (8).

11. A device in accordance with claim 8, wherein the spring (17) comprises at least two helical springs, which are secured against displacement in recesses (16) uniformly distributed on the end face (7') of the roll neck (2) and/or in the pressure shoulder ring (8).

* * * * *